April 13, 1965 W. A. SPOFFORD 3,177,674
REFRIGERATION SYSTEM INCLUDING CHARGE CHECKING MEANS
Filed March 9, 1964
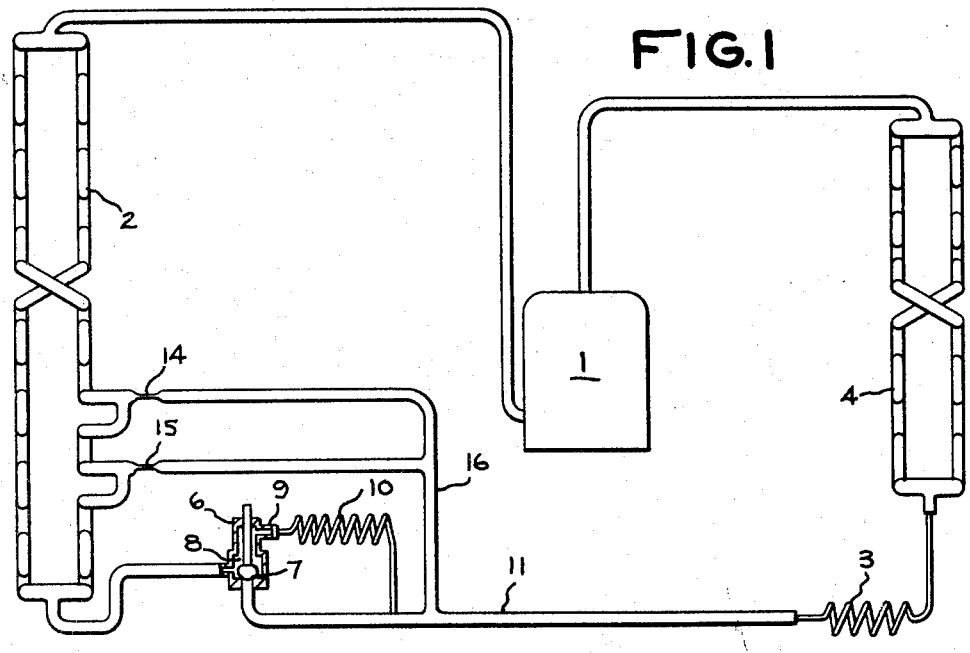
FIG.1
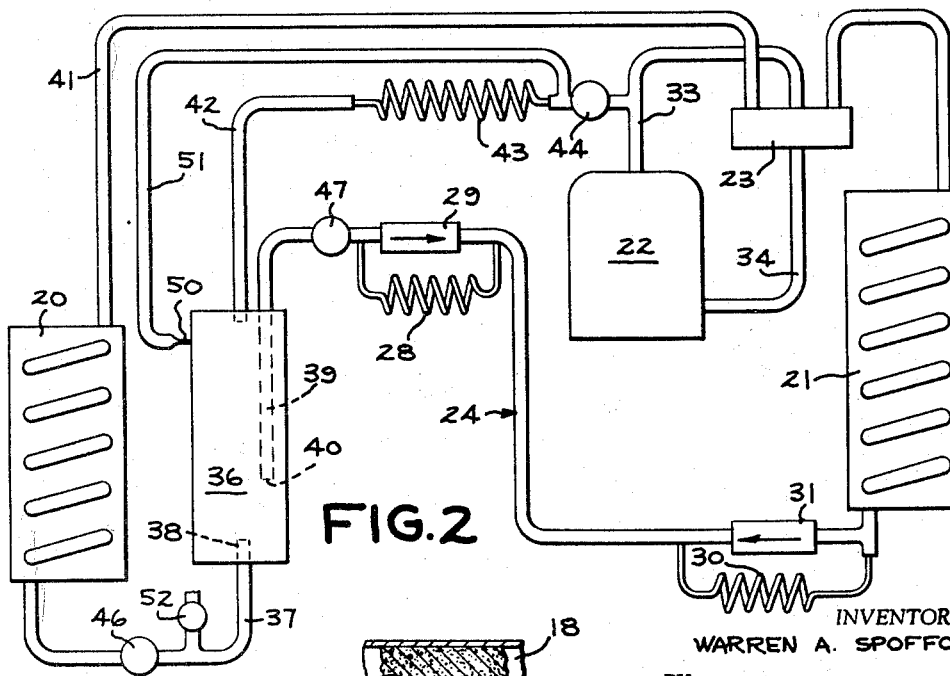
FIG.2
FIG.3
INVENTOR.
WARREN A. SPOFFORD
BY
HIS ATTORNEY

United States Patent Office

3,177,674
Patented Apr. 13, 1965

3,177,674
REFRIGERATION SYSTEM INCLUDING CHARGE CHECKING MEANS
Warren A. Spofford, Tyler, Tex., assignor to General Electric Company, a corporation of New York
Filed Mar. 9, 1964, Ser. No. 350,367
5 Claims. (Cl. 62—129)

The present invention relates to refrigeration systems and is particularly concerned with systems including means for checking the amount of refrigerant contained therein and for indicating when the addition or removal of refrigerant has provided the proper charge for normal operation thereof.

It is well known that during normal operation of a refrigeration system comprising a compressor, a pair of heat exchangers and means for controlling the flow of refrigerant between the heat exchangers, the amounts of refrigerant contained in the various components of the system will vary depending, for example, upon ambient temperature and load conditions so that during normal operation, the amount of refrigerant in any particular component cannot be employed as an accurate measure of the total or optimum refrigerant charge. In fact, the determination of the actual refrigerant charge contained in a refrigeration system has always been a problem particularly in the field servicing thereof. For many years the means generally used for providing a refrigerant system with the proper charge of refrigerant have comprised either the evacuation of the system followed by recharging of the system with an accurately weighed charge of refrigerant or the comparison of the system performance with predetermined performance curves and the addition or removal of refrigerant as required to provide the proper performance. The first method is wasteful in the field checking of a refrigerant system since most or all of the refrigerant originally contained in the system is lost during the evacuation. The second method is time consuming and frequently requires the provision of a plurality of performance curves for different ambient or operating conditions.

Recently there have been provided or proposed refrigeration systems including charge checking means designed to avoid the disadvantages of the charge checking methods referred to hereinbefore. Refrigeration systems including such charge checking means are disclosed and claimed, for example, in the applications of Herbert M. Brody, Serial No. 284,155, filed May 29, 1963, now abandoned and Serial No. 307,835, filed September 10, 1963, both of which applications are assigned to the same assignee as the present application. These systems have in common the provision in the system of a container capable of containing in liquid form a substantial portion of the refrigerant for the system, means for operating the system so that a substantial portion of the charge will collect as a liquid in that container and means in the form of a sight glass or bleed cock whereby the serviceman can determine whether or not the collected liquid refrigerant represents the optimum charge for the system.

As the inventions of the Brody applications were made by said Brody prior to the present invention, I therefore do not herein claim as my invention anything shown or described in those applications which are to be regarded as prior art with respect to the present application. Rather the present invention is directed to refrigeration systems including a container or equivalent storage means of the type included in the systems of the Brody application but specifically including a highly restrictive refrigerant conduit or passage in place of a sight glass or bleed cock for detecting the refrigerant liquid level in the container.

Briefly described, in accordance with one aspect of the present invention, there is provided a closed refrigeration system including a container adapted to contain a quantity of liquid refrigerant indicative of the total charge of refrigerant in the system and means including a charged checking flow restrictor connecting the storage means with the low pressure portion of the system and adapted upon operation of the system on a charge checking cycle to cause a portion of the refrigerant in the system to collect as a liquid in the storage means. For the purpose of indicating whether or not the amount of liquid refrigerant so collected corresponds to the amount which would be present in the container when the proper charge of refrigerant is present in the system, there is provided a line or conduit bypassing the charge checking flow restrictor and including a highly restrictive flow restricting means adapted to frost upon the passage of liquid refrigerant therethrough. The branch line or conduit is connected to the container at an elevation such that the frosting or lack of frosting is an indication of the level of liquid refrigerant in the container.

Additional features and advantages of the present invention will become apparent as the following description proceeds and the features of novelty which characterize the invention will be pointed out with particularity in the claims annexed to and forming a part of this specification.

For a better understanding of the invention reference may be had to the accompanying drawing in which:

FIGURE 1 is a diagrammatic illustration of a simple refrigeration system embodying the present invention; and FIGURE 2 is a diagrammatic illustration of a reverse cycle refrigeration circuit embodying the present invention.

Referring now to the drawing, FIGURE 1 shows a simple refrigeration system comprising a compressor 1, a condenser 2, a capillary flow restrictor 3 and an evaporator 4 connected in closed series flow relationship so that the compressor 1 withdraws vaporized low pressure refrigerant from the evaporator 4 and discharges warm, high pressure or compressed refrigerant into the condenser 2 where it is cooled and condensed. Liquid refrigerant is fed from the condenser to the evaporator 4 under the control of the normal flow restricting means in the form of a capillary tube 3. During normal operation of the system, refrigerant is continuously condensing as a liquid in the condenser 2 and liquid refrigerant fed to the evaporator 4 by the flow control means 3 is continuously evaporating in the evaporator so that liquid refrigerant may be present in either or both of these components during normal operation of the system.

In order to operate the system on a charge checking cycle by means of which a substantial portion of the charge contained within the system is transferred to and collected as a liquid in the condenser 2 where its total volume can be measured, there is provided a normally open valve 6 at the outlet end of the condenser 2 which is adapted to be closed for charged determination purposes. The specific valve shown in the drawing includes both a front seat 7 and a back seat 8. The valve is normally back seated so that there is an unrestricted flow of refrigerant from the condenser 2 through the front seat 7 to the capillary 3. A bypass line 9 including a charge checking restrictor in the form of a capillary 10 bypasses the front seat 7 of the valve and is connected through the back seat 8 with the line 11 leading to the capillary 3. When the valve 6 is front seated, the only connection between the condenser 2 and the evaporator 4 is through the capillary 10 and the flow restriction provided by the capillary 10, alone or in combination with the normal capillary 3, is preferably designed to be sufficient to cause substantially all of the refrigerant charge in the system to collect as a liquid in the condenser 2 when the compressor is operated with the valve 6 front seated. In other words with the charge determining capillary 10 in the circuit, high pressures will prevail in the portions of the system between the compressor and the valve 6 while low pressures will exist in the evaporator and adjacent portions of the system between the capillary 10 and the compressor 1.

However, the flow restriction provided by the restrictor 10 preferably is also such that there is sufficient circulation of refrigerant through said system so that any liquid refrigerant which is trapped in any part of the system other than in the condenser 2 will be quickly swept into the condenser by the flow of gaseous or vaporized refrigerant being withdrawn from the low pressure portion or side of the system. As a result, depending upon pressures prevailing in the condenser 2 during the charge determining cycle, substantially all or a substantial portion of the refrigerant collects as a body of liquid in the lower portion of the condenser 2 or more specifically ahead of the valve 6. Thus on the charge checking cycle the condenser 2 functions as a receptacle or container for the liquid component of the refrigerant present in the system.

In accordance with the present invention means for determining whether the amount of liquid collecting in the condenser 2 corresponds to the proper charge of refrigerant for the system are provided in the form of a highly restrictive vent or connection connecting the condenser 2 at a predetermined height or level to a low pressure portion of the system downstream from the capillary 10. Either one or a plurality of such vents can be employed and in the embodiment of the invention illustrated in FIGURE 1 two such refrigerant vents 14 and 15 are connected at appropriate levels or elevations to the condenser 2 and both of them are connected by means of a line 16 to the lower pressure conduit 11 between the restrictor 10 and the capillary 3. When more than one vent is employed one of the vents 14 is preferably connected to the condenser at an elevation above the optimum liquid level of refrigerant in the condenser during the charge checking cycle of operation and the other vent 15 is connected slightly below this level.

The highly restrictive vents 14 and 15 provide means for determining the level of liquid refrigerant within the condenser 2 so that refrigerant can be added and subtracted as required to provide the proper charge of refrigerant in the system. Whenever during the charge checking cycle, refrigerant entering either of the vents 14 and 15 enters as a vapor, rather than as a liquid, there will be no evaporation so that the vent will not be chilled. On the other hand when liquid refrigerant flows through either vent the liquid expands and vaporizes as it passes through the vent with the result that the immediate vicinity of the vent will be chilled and frost will collect on the outside of the tubing. Thus the presence or absence of frost are respectively indications of liquid or vapor flow. Therefore, in a refrigerating system in which the proper liquid level during the charge checking cycle is at a level which is between the vents 14 and 15, the proper or approximately the proper charge is indicated by the frosting of the vent 15 and the lack of frosting of the vent 14. If the liquid level is too low so that only gaseous refrigerant is observed as flowing through both of the vents or if the liquid level is too high so that liquid refrigerant, as indicated by frosting of both vents, is passing therethrough, refrigerant is either added to the system or is bled from the system until the proper charge is present in the system, that is, until the level of liquid refrigerant in the condenser is between the vents 14 and 15.

The restrictive vents 14 and 15 may be either highly restrictive capillary tubes or as shown in FIGURE 3 of the drawing or in the form of a porous metal powder plug 17 provided within a portion of the tubing 14 adjacent the condenser 2. This plug may for example be a sintered porous bronze mass made by sintering bronze powder as described for example in Patent 2,576,610—Kunzog. Preferably the porous plug 17 is formed within a copper tubing 18 so that the porous metal is bonded to the walls of the tube. The plug or equivalent flow control means is designed to have a flow which is insignificantly small as compared with the flow of refrigerant pumped by the compressor or passed by capillary 10.

FIGURE 2 illustrates an embodiment of the present invention in the form of a heat pump comprising an indoor heat exchanger 20, an outdoor heat exchanger 21, a compressor 22, a reversing valve 23 and suitable conduits including a conduit 24 between the two heat exchangers for connecting the various elements of the heat pump in such a manner that either of the heat exchangers 20 and 21 can function as a condenser or as an evaporator. The conduit 24 also includes normal flow control or flow restricting means for maintaining the desired pressure differences between the two heat exchangers on either the heating or the cooling cycle of operation of the heat pump. More specifically, the conduit 24 includes a cooling capillary 28 and a heating capillary 30. A bypass line including a check valve 29 bypasses the capillary 28 when the heat pump is operated as a heating unit and the indoor heat exchanger 20 is functioning as a condenser. A bypass line including a check valve 31 bypasses refrigerant around the capillary 30 when the heat pump is operating on the cooling cycle. The compressor 22 has an inlet or suction line 33 and an outlet or a discharge line 34 both of which are connected to the reversing valve 23 and this valve in turn is connected to the heat exchangers 20 and 21 so as to effect flow of refrigerant in either direction through the refrigerant circuit including the two heat exchangers.

For the optimum operation of the heat exchanger of this type comprising fixed flow control means for controlling the pressure differentials between the two heat exchangers, a smaller circulating refrigerant charge is desired on the heating cycle than on the cooling cycle. To provide a decrease in the effective refrigerant charge when the heat pump is changed over from operation on the cooling cycle to the heating cycle, there is provided a container 36 between the indoor heat exchanger 20 and the normal flow restricting means provided in the conduit 24. This container 36 is connected to the heat exchanger 20 by a conduit 37 which has one end 38 opening into the bottom of the container 36. The container 36 is connected to the conduit 24 including the normal flow restricting means by means of a line 39 having one end 40 thereof communicating with the interior of the container at an intermediate point which is above the end 38 of the conduit 37 a distance such that the volume of the container 36 between these two points of communication is substantially equal to the difference between the optimum refrigerant charges for the system on the cooling and heating cycles.

On the cooling cycle of operation of the heat pump, the compressor discharges compressed refrigerant through the discharge line 34 and the reversing valve 23 into the outdoor heat exchanger 21. The condensed liquid refrigerant from the outdoor heat exchanger bypasses the capillary 30 but flows through the capillary 28 into the container 36. The refrigerant passes through the container 36 and the line 37 into the indoor heat exchanger 20 whereby the air in the dwelling or other structure being conditioned by the heat pump is cooled. Gaseous refrigerant is withdrawn from the heat exchanger 20 through the conduit 41 and the valve 23 into the inlet 33 of the compressor 22.

When the valve 23 is reversed for operation of the system on the heating cycle, hot compressed refrigerant from the compressor 22 passes through the discharge line 34, the valve 23 and the line or conduit 41 into the indoor heat exchanger 20 where the hot compressed refrigerant is condensed giving up its heat of condensation to the space being conditioned. The condensed or liquid refrigerant then flows through the conduit 37 into the container 36 in which liquid refrigerant will collect until the level thereof reaches the end 40 of the line 39. The volume of liquid so collected represents the difference in optimum charges on the heating and cooling cycles. After this volume has collected liquid, liquid refrigerant flows through the check valve 29 and capillary 30 into the outdoor heat exchanger 21. The refrigerant evaporated in the outdoor heat exchanger 21 is withdrawn by the compressor through the valve 23 and the suction line 33.

Whereas the condenser 2 in the system of FIGURE 1 functioned as the container or storage means for liquid refrigerant in the system during the charge determining cycle, in the heat pump illustrated in FIGURE 2, the container 36 provides a storage and charge measuring means. To this end, the container 36 is made of a capacity sufficient to contain the portion of the total optimum charge of refrigerant present in liquid form during the charge checking cycle and means are provided as part of the heat pump system for operating the system in such a manner that the only liquid present in the system will be in the container 36. More specifically there is provided a charge checking conduit 42 connecting the upper end of the container 36 with the suction line 33. This conduit 42 includes a charge checking flow restrictor 43 and a normally closed valve 44. In order that the charge can be checked when the valve 23 is positioned for operation of the system on either the heating or the cooling cycle, the heat pump also includes a normally open valve 46 in the line 37 connecting the container 36 to the heat exchanger 20 and a normally open valve 47 between the line 39 and the capillary 28.

When it is desired to determine the charge of refrigerant in the system during operation of the heat pump with valve 23 in its closing position, valve 46 is closed and valve 44 is opened. The closing of the valve 46 prevents flow of liquid refrigerant to the indoor coil 20 or, in other words, prevents any liquid refrigerant collecting in the container 36 from flowing through the conduit 37. At the same time any liquid refrigerant present in the heat exchanger 20 will be evaporated and returned to the compressor through the low pressure conduit 41 and the reversing valve 23. Refrigerant condensed in the outdoor heat exchanger 21 during operation of the system flows through the capillary 28 into the container 36 where it is maintained in a liquid or condensed state by the pressure maintained in the container 36 due to the flow restrictor 43 which is the only connection between the container 36 and the compressor during the charge checking operation.

Thus the restrictor 43, which serves the same general function as the restrictor 10 in the simple refrigeration system of FIGURE 1, will cause any liquid refrigerant contained in other portions of the system to evaporate so that the only liquid refrigerant in the system will be in the container 36. The proportion of the total charge contained as a liquid in the container 36 will depend upon a number of factors including the vapor storage volumes of the remaining portions of the system, such as the indoor and outdoor heat exchangers, and the restriction or pressure differential provided by the flow restrictor 43. However, even though not much more than half of the total charge in the system may collect as a liquid in the container 36 during the charge checking cycle, the amount of liquid so collected is proportional to and hence representative of the total charge in the system.

For the purpose of indicating whether or not the liquid so collected in container 36 is representative of the proper charge for the system, there is provided a vent 50, comparable to the vents 14 and 15 of the system of FIGURE 1, connected to container 36 at the proper or normal charge checking liquid level and in turn connected by a tube 51 to that part of the conduit 42 between the charge checking capillary 43 and the valve 44. If refrigerant vapor passes through the vent 50 it will have no significant refrigerating effect. Hence the lack of frost adjacent the vent 50 will indicate that the amount of liquid stored within the container 36 is insufficient. However, if liquid enters the vent 50 the drop in pressure of the liquid refrigerant passing through the vent 50 will result in evaporation and chilling such that a frosting of the vent 50 or adjacent areas will indicate an excessive charge. Thus with the system operating on the charge checking cycle, refrigerant is either added to or removed from the system through a servicing valve 52 until in the surface area adjacent vent 50 a transition from either frosting to no-frosting or no-frosting to frosting indicates a liquid level at the approximate height of the vent. It will be obvious, of course, that two or more vents functioning in the same manner as vents 14 and 15 of FIGURE 1 may be used in place of single vent 50.

In order to check the charge when valve 23 is set for a heating cycle of operation, the valve 47 rather than the valve 46 is closed while the valve 44 is opened thereby creating pressure conditions within the system such that a portion of the refrigerant charge collects as a liquid in the container 36. Since the total charge in the system is the same regardless of the cycle of operation, the same vent 50 is employed for charge checking purposes.

While there has been shown and described specific embodiments of the present invention, it is to be understood that the invention is not limited thereto and it is intended by the appended claims to cover all modifications within the spirit and scope of the invention.

What I claim as new and desire to secure by Letters Patent of the United States is:

1. In a refrigeration system including a compressor, a first heat exchanger adapted to be operated as a condenser, a second heat exchanger adapted to be operated as an evaporator, and a conduit including means for normally controlling flow of refrigerant between said heat exchangers;
   means for determining the refrigerant charge in said system comprising a normally open valve in said conduit and capillary flow restricting means connected to said conduit and bypassing said valve for substantially restricting the flow of refrigerant from said first heat exchanger to said second heat exchanger when said valve is closed so that a substantial portion of the refrigerant charge in said system will collect as a liquid in said first heat exchanger,
   measuring means for indicating when the level of liquid refrigerant so collected represents the desired refrigerant charge for said system,
   said measuring means comprising a highly restrictive vent connected in parallel with said valve and capillary flow restricting means and adapted to frost when liquid rather than vapor refrigerant flows through said vent,
   said vent being connected at its inlet end to said first heat exchanger at approximately the liquid level of the proper refrigerant charge for said system and at its outlet end to a point in said system between said valve and said compressor.

2. A refrigeration system comprising:
   a normal refrigerant circuit including a first heat exchanger, a conduit including flow restricting means, and a second heat exchanger series-connected in a closed refrigerant circuit,
   means including a compressor and a suction line for withdrawing low pressure refrigerant from said first heat exchanger and discharging high pressure refrigerant to said second heat exchanger,
   a container connected in said conduit between said heat exchangers, normally open valve means in said conduit between said container and said first heat exchanger and adapted when closed to stop the flow of refrigerant from said container to said first heat exchanger, a charge checking line including a normally closed valve means and a flow restrictor having a substantial flow restriction connecting said container adjacent the top thereof with said suction line and adapted when said system is operated with said normally closed valve means open and said normally open valve means closed to cause a substantial portion of the refrigerant charge in said system to collect as a liquid in said container, a highly restrictive connection between said container and said suction line adapted to collect frost by the passage of liquid refrigerant into said connection when the quantity of liquid refrigerant collected in said container is indicative of the proper charge.

3. A refrigeration system comprising:
a normal refrigerant circuit including a first heat exchanger, a conduit including flow restricting means, and a second heat exchanger series-connected in a closed refrigerant circuit, means including a compressor having a suction line for withdrawing low pressure refrigerant from said first heat exchanger and discharging high pressure refrigerant to said second heat exchanger, a container connected in said conduit between said heat exchangers, normally open valve means in said conduit between said container and said first heat exchanger and adapted when closed to stop the flow of refrigerant from said container to said first heat exchanger, a charge checking line including a charge checking flow restrictor and normally closed valve means connecting said container adjacent the top thereof with said suction line, said charge checking flow restrictor having a flow restriction such that when said system is operated with said normally closed valve means open and said normally open valve means closed, a substantial portion of the refrigerant charge in said system will collect as a liquid in said container, and means for indicating when the total quantity of liquid refrigerant so collected is indicative of the proper charge of refrigerant for said system, said indicating means comprising a highly restrictive connection between said container and said suction line adapted to collect frost by the passage of liquid refrigerant into said connection when the quantity of liquid refrigerant collected in said container is indicative of the proper charge.

4. In a refrigeration system including a compressor, a first component adapted to be operated as a condenser, a conduit including normal flow control means, and a second component adapted to be operated as an evaporator connected in closed series-flow connection;

means for determining the refrigerant charge in said system comprising a normally open valve in said conduit between said components for stopping the normal flow of refrigerant from said first component to said second component and a capillary flow restrictor connected to said conduit in parallel with said valve, said flow restrictor providing a flow restriction such that when said valve is closed and said compressor is operating, substantially all of the refrigerant charge in said system will collect as a liquid ahead of said valve, and a branch line bypassing said valve and having its inlet connected to said system ahead of said valve at a point such that the portion of said system between said point and said valve means has a liquid storage volume representing the proper charge of refrigerant for said system and its outlet connected to said system between said valve means and said compressor, said branch line including a restricting vent adapted to frost upon passage of liquid refrigerant therethrough.

5. In a refrigeration system including a compressor, a first component adapted to be operated as a condenser, a conduit including normal flow control means, and a second component adapted to be operated as an evaporator connected in closed-series flow connection;

means for checking the refrigerant charge in said system comprising a normally open valve in said conduit between said components for stopping the normal flow of refrigerant from said first component to said second component and a capillary flow restrictor bypassing said valve and having its inlet connected to said system ahead of said valve and its outlet connected to said system between said valve and said compressor, said flow restrictor providing a flow restriction such that when said valve is closed and said compressor is operating substantially all of the refrigerant charge in said system will collect as a liquid ahead of said valve means, at least two restrictive vents having their inlets connected to said system ahead of said valve and said flow restrictor and their outlets connected to said system between said valve and said compressor, one of said vents being connected to said system above the level of liquid refrigerant so collected when said system contains the optimum charge and the second of said vents being connected to said system below said level whereby when said charge checking means is in operation, frosting of said second vent and lack of frosting of said first vent indicates that said system contains substantially the optimum charge.

References Cited by the Examiner

UNITED STATES PATENTS

| | | | |
|---|---|---|---|
| 1,533,336 | 4/25 | Pownall | 62—292 |
| 2,049,364 | 7/36 | Fisher | 62—292 |
| 2,759,340 | 8/56 | Beslin | 62—149 |
| 2,977,773 | 4/61 | De Kanter | 62—149 |
| 3,093,976 | 6/63 | Walcutt | 62—509 |

ROBERT A. O'LEARY, Primary Examiner.